United States Patent [19]

Shatila

[11] 3,883,671

[45] May 13, 1975

[54] WETTING THE SURFACES OF DOUGH PIECES PRIOR TO FRYING TO ELIMINATE BLISTERING

[75] Inventor: Mounir A. Shatila, Blackfoot, Idaho

[73] Assignee: American Potato Company, San Francisco, Calif.

[22] Filed: May 7, 1973

[21] Appl. No.: 357,997

[52] U.S. Cl. ............... 426/303; 426/347; 426/439; 426/441; 426/456; 426/458
[51] Int. Cl. ........................... A23l 1/00; A23l 1/12
[58] Field of Search .......... 426/438, 439, 440, 441, 426/455, 456, 506, 509–511, 342, 346, 347, 372, 446, 457, 458, 302, 303

[56] References Cited
UNITED STATES PATENTS

| | | | |
|---|---|---|---|
| 3,027,258 | 3/1962 | Markakis | 426/441 |
| 3,230,094 | 1/1966 | Hilton | 426/438 |
| 3,297,450 | 1/1967 | Loska | 426/441 |
| 3,355,299 | 11/1967 | McLaughlin | 426/441 |
| 3,634,095 | 1/1972 | Willard | 426/441 |
| 3,649,305 | 3/1972 | Wilder | 426/441 |
| 3,681,084 | 8/1972 | Beck | 426/441 |
| 3,812,274 | 5/1974 | Weaver | 426/438 |

*Primary Examiner*—Norman Yudkoff
*Assistant Examiner*—M. G. Mullen

[57] ABSTRACT

The surfaces of formed flats of snack dough at a moisture content of about 25–50% are moistened immediately before frying in deep fat. The moisture content of the surface of the flat is increased quickly by spraying with water, dipping in water, or by steaming. The moistened flat is then fried without holding to prevent excessive penetration of the added surface moisture into the interior of the flat. Treated flats, even in thicknesses up to 0.045 inch can be fried without the formation of surface blisters or puffing.

5 Claims, No Drawings

WETTING THE SURFACES OF DOUGH PIECES PRIOR TO FRYING TO ELIMINATE BLISTERING

BACKGROUND OF THE INVENTION

1. Field of the Invention

The invention relates to increasing the surface moisture of formed pieces of snack dough immediately prior to deep fat frying to produce a crisp snack product.

2. Description of the Prior Art

Deep fat fried snacks are becoming increasingly popular. One type can be described as expanded snacks which, upon frying in deep fat, expand several fold in volume forming a popcorn-like matrix. Before deep fat frying, these products are horn-like, translucent, and generally have a moisture content below 10%. Processes to produce snacks of this type are disclosed in U.S. Pat. Nos. 3,259,503, 3,076,711, 3,451,822, 3,230,094, 3,297,450, and Canadian Pat. No. 911,806.

A second type of snack is also of the expanded type, but the expansion is obtained by extruding a dough through an orifice from an area of very high pressure and temperature to atmospheric pressure and temperature, thereby resulting in released steam which expands the product many fold. This type of snack is disclosed in Great Britain Pat. No. 1,294,826. A third type of snack of increasing popularity can be loosely described as a synthetic potato chip-type which is similar to a potato chip in structure and texture. Processes to produce such products are disclosed in U.S. Pat. Nos. 3,539,356, 3,519,432, Great Britain Pat. No. 1,195,138, and copending application, Ser. No. 146,835, assigned to American Potato Company as is this disclosure. Such products are made by forming a relatively high moisture dough into flats of desired shapes and sizes; and then deep fat frying the flats at about 10–50% moisture content to form the snack. In some processes, an air predrying step is incorporated prior to frying. Such fabricated potato chip-like snacks have many advantages which are disclosed in the prior art but are not pertinent to this invention which relates to an added processing step which improves such finished snack products.

A special problem encountered in the production of such snacks from dough is in the formation of surface blisters during frying which detract from appearance and often result in excessive oil content. U.S. Pat. NO. 3,608,474 discloses apparatus for frying dough pieces confined within a mold which physically prevents large blister formation. Another prior art technique is to form flats with corrugated surfaces which likewise tend to prevent blistering. Another technique used is to process a very thin layer of dough of about 0.02-inch thickness since blistering is less of a problem if the snack flat is thin. The resulting snacks, however, have increased fragility and break in handling and in distribution channels. It heretofore has not been possible to produce consistently a snack of smooth blister-free surface with a thickness in the range of 0.030–0.045 inch without the use of techniques such as those mentioned above. This invention solves this problem and discloses a process for the production of thicker, non-fragile blister-free snacks.

SUMMARY OF THE INVENTION

Dough flats for eventual deep fat frying to produce snacks of the potato chip-type are normally produced in the moisture range of 20 to 50%, although if a predrying step is employed, the moisture can be as low as 10–12% prior to frying. This invention relates to an added processing step conducted on such a flat immediately before the deep fat frying step. If water is applied to thoroughly wet the surfaces and then the wetted flat piece is introduced into the hot fat before the added surface moisture has had an opportunity to penetrate appreciably into the flat, the surface is apparently made more porous and the steam formed within the piece during deep fat frying is released uniformly and blister formation does not occur. With most doughs of this type, the optimum time of application with water prior to frying is only 1 to 5 seconds as it is necessary only to wet all surfaces; however, if the flat is allowed to stand with moistened surfaces for more than 1 minute before deep fat frying, moisture penetration into the interior of the flat affects finished texture adversely, producing an undesirably flinty texture. A brief draining step of a few seconds duration can be employed if desired to remove free surplus surface water prior to frying. Excess water can also be removed by blowing it from the surfaces with an air jet. This draining step is not part of the invention; however, it reduces spattering which occurs when free water is added to hot fat. The manner in which water is applied to the flat surfaces is not critical. Spraying or dipping in water as well as exposing to steam have been found equally effective.

DESCRIPTION OF THE PREFERRED EMBODIMENTS

Example 1

A dough of about 32% moisture was produced, the solids of which comprised about 98.5% of potato granules possessing high Cold Water Absorption characteristics and 1.5% by weight salt. The dough was sheeted 0.03–0.045 inch and cut into flats roughly the size of conventional potato chips. The flats were divided into two test groups. Test 1-A was immediately deep fat fried at 350°F. for about 15 seconds. Test 1-B was dipped in water for about 2 seconds; allowed to drain for about 2 seconds and then immediately deep fat fried as above. The snacks of Test 1-A were good in flavor but had a soft-type texture and an unattractive appearance due to some surface blistering. The snacks of Test 1-B were free from surface blisters and were excellent in texture and flavor.

Example 2

The excess dough from the sheets of Example 1 was passed through the sheeting equipment 3–10 consecutive times and then sheeted and cut as in Example 1. The flats were divided in two groups. In Test 2-A, the flats were fried directly and in Test 2-B, the flats were dipped into water as in Test 1-B and then fried. This test is more severe than conventional processes which generally recycle 20–35% of the dough.

The snacks from Test 2-A were severely blistered while the snacks from Test 2-B were free of blisters. The oil content of the snacks of Test 2-A was 30%, whereas, the snacks of Test 2-B had an oil content of 22%, which is in the desirable range.

Example 3

The procedure of Example 1 was repeated and the flats were divided into three groups. In Test 3-A, flats were dipped in water as in Example 1; in Test 3-B, flats were sprayed on all surfaces with a water mist, and in Test 3-C, flats were exposed to live steam to moisten the surfaces. In each case, the flats were deep fat fried as in Example 1 immediately after the moistening treatment. The finished snacks from all three groups were free from blisters.

The above moistening step was found to be effective in preventing surface blistering when other forms of potato solids, such as potato flakes, and cereals or mixtures of starchy cereals, such as corn, wheat and rice with potato solids were used as dough constituents. Cohesiveness is required to provide proper sheetability characteristics and finished snack piece integrity. When the required cohesiveness is obtained either by the nature of the constituents or the working of the dough to produce starch cell rupture, the surfaces of the flats tend to become impervious to steam passage from the interior during frying and the resulting snack blisters, pillows or puffs. The surface moistening step prevents such deformation.

The efficiency of the moistening step was dramatically illustrated in one test where a dough flat was immersed in water while holding between the thumb and forefinger. When fried, the snack was blistered only in the areas on each side protected from moisture contact by the finger and thumb tips.

What is claimed is:

1. A process for the production of a blister-free chip-like snack comprising the steps of:
    a. formulating a dough of 25–50% moisture content comprising solids selected from the group consisting of potato, corn, wheat and rice solids and water;
    b. forming potato chip sized pieces having a thickness in the range of 0.030–0.045 inch from said dough;
    c. moistening the surfaces of said pieces with water;
    d. introducing said moistened pieces into hot fat in less than 1 minute following said moistening step before the added surface moisture penetrates appreciably into said formed pieces and deep fat frying said moistened pieces to produce a blister-free potato chip-like snack.

2. The process as recited in claim 1 in which said moistening step is selected from a group consisting of dipping, spraying, and steaming.

3. The process as recited in claim 1 in which said moistening step is accomplished by dipping the pieces into water for 1 to 5 seconds.

4. The process as recited in claim 1 in which an excess water removing step is performed immediately following said moistening step and immediately prior to said deep fat frying step.

5. A blister-free potato chip-like snack produced by the process of claim 1.

* * * * *